United States Patent
Frolikov

(10) Patent No.: US 11,204,841 B2
(45) Date of Patent: Dec. 21, 2021

(54) META DATA PROTECTION AGAINST UNEXPECTED POWER LOSS IN A MEMORY SYSTEM

(71) Applicant: Micron Technology, Inc., Boise, ID (US)

(72) Inventor: Alex Frolikov, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 72 days.

(21) Appl. No.: 15/947,428

(22) Filed: Apr. 6, 2018

(65) Prior Publication Data
US 2019/0310918 A1 Oct. 10, 2019

(51) Int. Cl.
*G06F 11/00* (2006.01)
*G06F 11/14* (2006.01)
*G06F 1/3225* (2019.01)
*G06F 1/30* (2006.01)

(52) U.S. Cl.
CPC ............ *G06F 11/1446* (2013.01); *G06F 1/30* (2013.01); *G06F 1/3225* (2013.01); *G06F 2212/1032* (2013.01)

(58) Field of Classification Search
CPC ............ G06F 11/1402; G06F 11/1446; G06F 11/1448; G06F 11/1458; G06F 11/0727; G06F 11/073; G06F 11/2053; G06F 11/1008; G06F 11/1064; G06F 11/3058; G06F 11/3034; G06F 11/2015; G06F 11/1441; G06F 1/3225; G06F 1/30; G06F 2212/1032; G06F 2201/81
USPC ...................................................... 714/1–57
See application file for complete search history.

(56) References Cited

U.S. PATENT DOCUMENTS

| | | | |
|---|---|---|---|
| 7,954,006 B1* | 5/2011 | Mangipudi | G06F 1/30 713/340 |
| 10,423,783 B2* | 9/2019 | Pavlas | G06F 21/554 |
| 2009/0094482 A1* | 4/2009 | Zilberman | G11C 16/12 714/15 |
| 2010/0095048 A1* | 4/2010 | Bechtolsheim | G06F 11/1441 711/103 |
| 2010/0287333 A1* | 11/2010 | Lee | G06F 12/0873 711/103 |
| 2011/0126046 A1* | 5/2011 | Hoang | G06F 1/30 714/14 |
| 2011/0185211 A1* | 7/2011 | Chiasson | G06F 1/30 713/340 |

(Continued)

OTHER PUBLICATIONS

"Risks of unexpected power loss on solid state drives", HP Development Company, L.P., Mar. 2016.

*Primary Examiner* — Sarai E Butler
(74) *Attorney, Agent, or Firm* — Greenberg Traurig

(57) ABSTRACT

A memory system having a set of non-volatile media, a volatile memory, a buffer memory, and a controller configured to process requests from a host system to store data in the non-volatile media or retrieve data from the non-volatile media. The buffer memory is capable of holding data for at least a predetermined period of time after the volatile memory loses data during an event of power outage in the memory system. A power manager monitors a power supply of the memory system to detect an onset of power outage and, in response to the onset of power outage, causes the controller to copy meta data in the volatile memory to the buffer memory.

15 Claims, 3 Drawing Sheets

(56) References Cited

U.S. PATENT DOCUMENTS

| | | | | |
|---|---|---|---|---|
| 2014/0245105 A1* | 8/2014 | Chung | ................ | G06F 11/1048 |
| | | | | 714/763 |
| 2016/0196085 A1* | 7/2016 | Minamiura | ........... | G06F 3/0625 |
| | | | | 711/162 |
| 2016/0378582 A1* | 12/2016 | Choi | ....................... | G06F 13/00 |
| | | | | 714/37 |
| 2017/0123991 A1* | 5/2017 | Sela | ..................... | G11C 16/102 |
| 2017/0177244 A1* | 6/2017 | Khochare | ............. | G06F 3/0688 |
| 2017/0344474 A1* | 11/2017 | Zhou | ................... | G06F 12/0646 |
| 2018/0121106 A1* | 5/2018 | Kim | ....................... | G06F 3/0611 |
| 2018/0134585 A1* | 5/2018 | Burseth | ................... | C02F 1/325 |
| 2018/0143904 A1* | 5/2018 | Sweere | ................ | G06F 3/0619 |
| 2018/0157428 A1* | 6/2018 | Li | ....................... | G06F 11/1072 |
| 2018/0173434 A1* | 6/2018 | Li | ....................... | G06F 13/4068 |
| 2018/0349225 A1* | 12/2018 | Bishnoi | ............... | G06F 11/1441 |
| 2019/0294345 A1* | 9/2019 | Yu | ....................... | G06F 3/0685 |

* cited by examiner

META DATA PROTECTION AGAINST UNEXPECTED POWER LOSS IN A MEMORY SYSTEM

FIELD OF THE TECHNOLOGY

At least some embodiments disclosed herein relate to memory systems in general, and more particularly, but not limited to data protection against unexpected power loss in memory systems.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

Volatile memory devices require constant power supply to maintain their data content, while non-volatile memory devices do not require constant power supply to maintain the data content stored in the non-volatile memory devices.

In an event of sudden power loss in a memory system, the data in the volatile memory devices of the memory system may be lost or corrupted. To prevent the sudden power loss from causing data loss and/or data corruption in the memory system, a capacitor hold-up circuitry is used in some solid-state drives to provide sufficient power to complete a flushing operation that copies data from the volatile memory devices of a solid-state drive to the non-volatile memory devices of the solid-state drive. Alternatively, or in combination, an external backup, uninterruptible power supply can be used to power a solid-state drive and provide an opportunity for a clean shutdown of the solid-state drive during the unexpected loss of power from a regular power supply.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
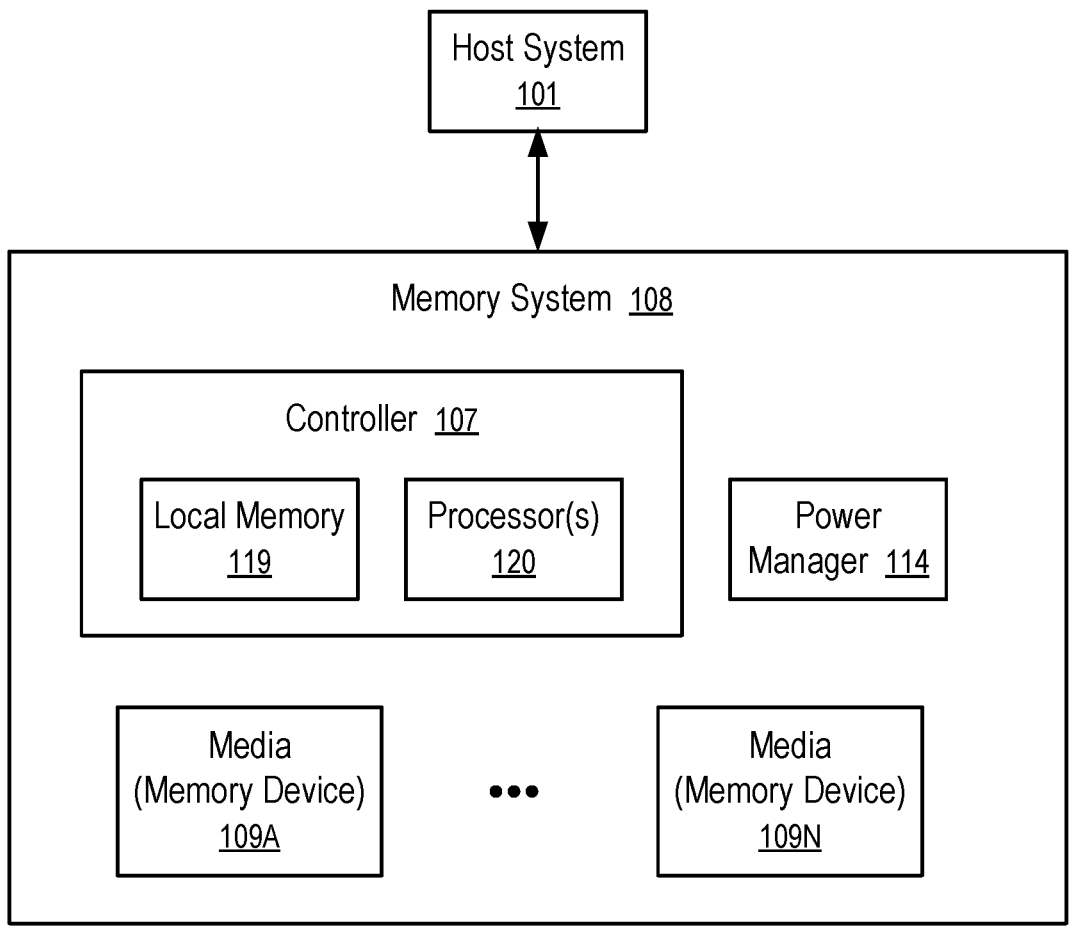
FIG. 1 shows a computing system having a memory system having a power manager in accordance with some embodiments of the present disclosure.

At least some aspects of the present disclosure are directed to the buffering of meta data in a memory system during unexpected power loss. An example of a memory system is a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, memory units formed based on negative-and (NAND) logic gates, memory units formed based on negative-or (NOR) logic gates, etc. The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system is used as one example of the memory system in the present disclosure.

A solid-state drive (SSD) typically includes a flash translation layer (FTL) that has meta data for mapping logical addresses, used by the host system to specify memory locations, and physical addresses that are used in the solid-state drive (SSD) to address memory units in its non-volatile memory devices. The meta data typically changes over time during active usage of the solid-state drive (SSD), in response to write operations and/or other operations, such as wear leveling and garbage collection.

A portion of the volatile memory of the solid-state drive (SSD) can be connected to a capacitor. The SSD fully charges the capacitor during normal operations. When an unexpected power loss event occurs, the capacitor can provide sufficient power to maintain data in the portion of the volatile memory for a predetermined period of time, during which the remaining portion of the volatile memory may lose power and data. The portion of the volatile memory powered by the capacitor has a size sufficient to accommodate the meta data of the flash translation layer to at least prevent the corruption of the address map between logical addresses and physical addresses. After being fully charged during the normal operation of the solid-state drive, the capacitor is sufficient to maintain data in the portion of the volatile memory for the predetermined period of time without power from another power supply. This period of time provides an opportunity to re-power up the SSD again and/or store the data to a non-volatile memory.

For example, in response to the detection of an unexpected power off event, the flash translation layer of the solid-state drive dumps its operation data, including the meta data cached in a volatile memory of the SSD, into the portion of volatile memory that is connected to the capacitor. When the solid-state drive (SSD) is provided with power again during the period of time in which the portion of the volatile memory is still powered by the capacitor, the data in the portion of the volatile memory can be used to facilitate recovery and/or debugging.

FIG. 1 shows a computing system having a memory system (108) having a power manager (114) in accordance with some embodiments of the present disclosure.

For example, the power manager (114) is configured to detect that a power supply to the memory system (108) is reaching below a threshold, which is indicative of an unexpected power loss event. In response, the power manager (114) causes the controller (107) to store, in a portion of volatile memory that has back up power from a capacitor, the meta data and/or operation data of the memory system (108), such as the address map of the flash translation layer. The capacitor allows the data in this portion of volatile memory to be held for a time period longer than other portions of volatile memory of the memory system (108).

In general, the memory system (108) can include media, such as memory devices (109A to 109N). The memory devices (109A to 109N) can be volatile memory devices, non-volatile memory (NVM) devices, or a combination of such. In some embodiments, the memory system (108) is a storage system. An example of a storage system is a solid-state drive (SSD). In some embodiments, the memory system (108) is a hybrid memory/storage system. In general, the computing system can include a host system (101) that uses the memory system (108). In some implementations, the host system (101) can write data to the memory system (108) and read data from the memory system (108).

The host system (101) can be a computing device such as a desktop computer, laptop computer, network server, mobile device, or such computing device that includes a memory and a processing device. The host system (101) can include or be coupled to the memory system (108) so that the host system (101) can read data from or write data to the memory system (108). The host system (101) can be coupled to the memory system (108) via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc. The physical host interface can be used to transmit data between the host system (101) and the memory system (108). The host system (101) can further utilize an NVM Express (NVMe) interface to access the memory devices (109A to 109N) when the memory system (108) is coupled with the host system (101) by the PCIe interface. The physical host interface can provide an interface for passing control, address, data, and other signals between the memory system (108) and the host system (101).

The memory devices (109A to 109N) can include any combination of the different types of non-volatile memory devices and/or volatile memory devices. An example of non-volatile memory devices includes a negative-and (NAND) type flash memory. Each of the memory devices (109A to 109N) can include one or more arrays of memory cells such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system (101). Although non-volatile memory devices such as NAND type flash memory are described, the memory devices (109A to 109N) can be based on any other type of memory such as a volatile memory. In some implementations, the memory devices (109A to 109N) can be, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices (109A to 109N) can be grouped as memory pages or data blocks that can refer to a unit of the memory device used to store data.

The controller (107) can communicate with the memory devices (109A to 109N) to perform operations such as reading data, writing data, or erasing data at the memory devices (109A to 109N) and other such operations. The controller (107) can include hardware such as one or more integrated circuits and/or discrete components, a buffer memory, or a combination thereof. The controller (107) can be a microcontroller, special purpose logic circuitry (e.g., a field programmable gate array (FPGA), an application specific integrated circuit (ASIC), etc.), or another suitable processor. The controller (107) can include one or more processors (processing devices) (120) configured to execute instructions stored in local memory (119).

In the illustrated example, the local memory (119) of the controller (107) includes an embedded memory configured to store instructions for performing various processes, operations, logic flows, and routines that control operation of the memory system (108), including handling communications between the memory system (108) and the host system (101), and the functions of the power manager (114), which is described in greater detail below. In some embodiments, the local memory (119) can include memory for the implementation of the power manager (114) and/or memory registers storing, e.g., memory pointers, fetched data, etc. The local memory (119) can include read-only memory (ROM) for storing micro-code.

While the example memory system (108) in FIG. 1 has been illustrated as including the controller (107), in another embodiment of the present disclosure, a memory system (108) may not include a controller (107), and may instead rely upon external control (e.g., provided by an external host, or by a processor or controller separate from the memory system).

In general, the controller (107) can receive commands or operations from the host system (101) and can convert the commands or operations into instructions or appropriate commands to achieve the desired access to the memory devices (109A to 109N). The controller (107) can be responsible for other operations such as wear leveling operations, garbage collection operations, error detection and error-correcting code (ECC) operations, encryption operations, caching operations, and address translations between a logical block address and a physical block address that are associated with the memory devices (109A to 109N). The controller (107) can further include host interface circuitry to communicate with the host system (101) via the physical host interface. The host interface circuitry can convert the commands received from the host system into command instructions to access the memory devices (109A to 109N) as well as convert responses associated with the memory devices (109A to 109N) into information for the host system (101).

The memory system (108) can also include additional circuitry or components that are not illustrated. In some implementations, the memory system (108) can include a cache or buffer (e.g., DRAM) and address circuitry (e.g., a row decoder and a column decoder) that can receive an address from the controller (107) and decode the address to access the memory devices (109A to 109N).

In one example, the host system (101) has one or more connectors to provide the memory system (108) with power and/or communicate with the memory system (108) via a communication channel and a predetermined protocol; and the memory system (108) has one or more connectors to receive the power, data and commands from the host system (101). For example, the connection between connector on the host system (101) and connector on memory system (108) may utilize a PCIe bus or a SATA bus.

Figure 2:
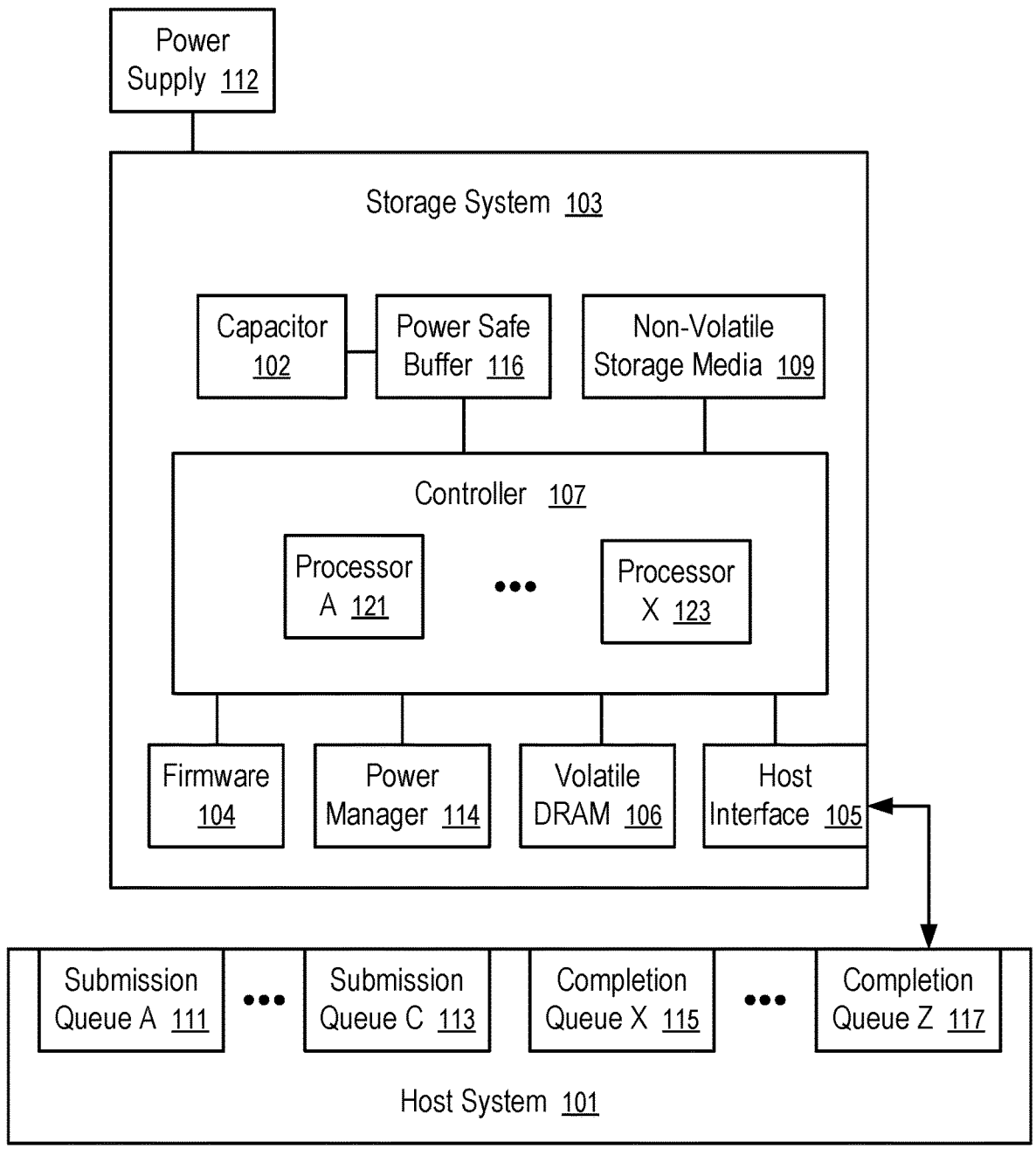
FIG. 2 shows a storage system configured with a power safe buffer to store data for a short period of time after sudden power loss.

FIG. 2 shows a storage system (103) configured with a power safe buffer (116) to store data for a short period of time after sudden power loss. For example, the storage system (103) of FIG. 2 can be used as an example of the memory system (108) in the computing system of FIG. 1.

The storage system (103) of FIG. 2 has a controller (107) executing firmware (104) to store data in or retrieve data from non-volatile storage media (109) using resources, such as volatile memory (106), registers, stacks, inter-process communication channels, in response to requests/commands communicated from the host system (101) via a host interface (105).

The controller (107) has a plurality of processors (121, ..., 123) that can be configured via the firmware (104) to run a plurality of processes that perform respectively a plurality of predefined types of tasks. Tasks of each type provide a core functionality of the storage system (103). Optionally, each process running a processor (e.g., 121) to perform a type of tasks is controlled by a respective task manager running the process (e.g., 121) in the controller (107).

For example, a flash translation layer manager can perform a type of tasks of translating a logical address to a physical address usable to address a memory unit in the non-volatile storage media (109).

For example, an input/output manager can perform a type of tasks of accessing the non-volatile storage media (109) to store data or retrieve data using a physical address.

For example, an administrative manager can perform a type of tasks of processing administrative commands, such as the creation or deletion of a namespace, the allocations of resources, etc.

The processes running the controller (107) may store operation data and/or meta data of the storage system (103) in volatile DRAM (106). For example, the flash translation layer manager stores at least a portion of a mapping table between logical addresses and physical addresses in the volatile DRAM (106).

The storage system (103) receives power from a power supply (112). A power manager (114) of the storage system (103) monitors the power from the power supply (112). When the power supply (112) provides sufficient power for normal operations of the storage system (103), a capacitor (102) is charged to store energy that can be used during a short gap of power outage in the power supply (112).

For example, a short time period of power outage may occur when a power supply (112) is accidentally switched off, or temporarily disconnected from the storage system (103).

In general, the power supply (112) may include a regular power supply and/or a backup power supply.

When the power manager (114) detects that the voltage of the power supply (112) is below a threshold, the power manager (114) indicates that an unexpected power loss occurs, which causes the processes running in the controller (107) to prepare for power outage.

For example, in response to the indication of the unexpected power loss, the flash translation layer manager copies its most recent version of the address mapping data from the volatile DRAM (106) to the power safe buffer (116).

In general, the power safe buffer (116) is used to save the meta data which, when corrupted, has impact on the integrity of other data (e.g., stored in the non-volatile storage media (109)). For example, when the address mapping data of the flash translation layer is corrupted or lost, the storage system (103) cannot access the correct memory units to retrieve data based on logical addresses received from the host system (101).

Reducing the amount of data to be saved in the power safe buffer (116) allows the use of a smaller capacitor (102) to maintain data in the power safe buffer (116) for a predetermined time period, or the use of a same capacitor (102) to maintain data in the power safe buffer (116) for a longer time period.

Optionally, the storage system (103) includes one or more further capacitors to support the operations to flush data from the power safe buffer (116) and/or the volatile DRAM (106) to the non-volatile storage media (109).

The power safe buffer (116) can be implemented as a portion of the volatile DRAM (106).

In some implementations, the task managers of the storage system (103) are configured to store the meta data of the storage system (103) in the power safe buffer (116) during their normal operations. Such an arrangement eliminates the need to dump the meta data from the volatile DRAM (106) to the power safe buffer (116) in response to the detection of an indication of power loss.

In other implementations, the assembly of the capacitor (102) and the power safe buffer (116) can be replaced with a non-volatile memory that has data access performance similar to the volatile DRAM (106). In response to detecting an indication of power loss, the power manager (114) can optionally compress the content of the volatile DRAM (106) and store the compressed content in the power safe buffer (116) (e.g., implemented using a non-volatile memory, such as a cross point memory device).

In general, the host system (101) can use message queues to submit requests/commands that are processed by the task managers running in the processors (121, ..., 123).

For example, a submission queue (e.g., 111, ..., or 113) can be used by the host system (101) to submit requests to the storage system (103); and a completion queue (e.g., 115, ..., or 117) can be used by the host system (101) to receive responses from the storage system (103).

For example, a version of NVMe (e.g., Non-Volatile Memory Host Controller Interface Specification 1.2) specifies the use of a circular buffer with a fixed slot size for a submission queue (e.g., 111, ..., or 113) or a completion queue (e.g., 115, ..., or 117).

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage system (103), commands to write data into the storage system (103), commands to compare data in the storage system (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the storage system (103) fetch the commands/requests from a submission queue (111, ..., or 113) according to the order in which the commands are placed in the submission queue (111, ..., or 113). However, the NVMe allows the controller (107) to execute the fetched commands in any order.

Figure 3:
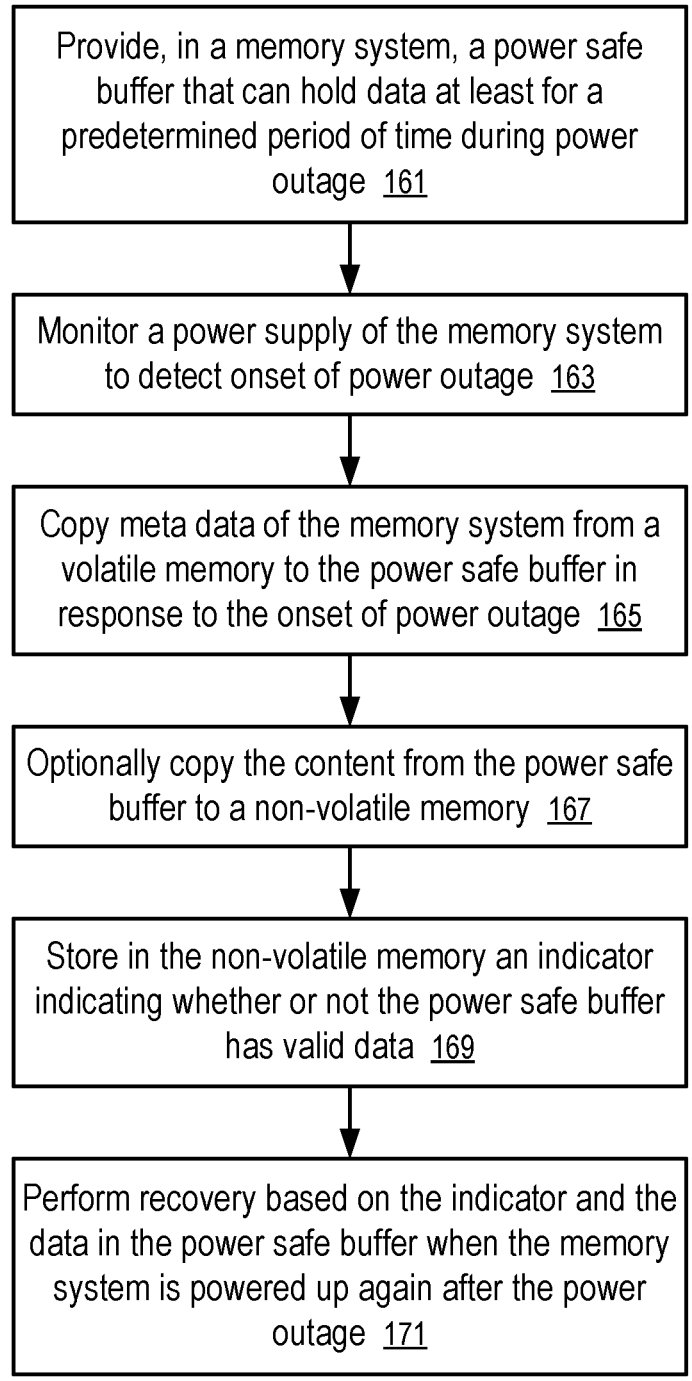
FIG. 3 shows a method of protecting meta data of a memory system during a power outage event.

FIG. 3 shows a method of protecting meta data of a memory system during a power outage event. For example, the method of FIG. 3 can be used in the memory system (108) of FIG. 1 in general and in the storage system (103) of FIG. 2 as an example.

The method of FIG. 3 includes: providing (161), in a memory system (e.g., 108 or 103), a power safe buffer (116) that can hold data at least for a predetermined period of time during power outage; monitoring (163) a power supply (112) of the memory system (e.g., 108 or 103) to detect onset of power outage; copying (165) meta data of the memory system (e.g., 108 or 103) from a volatile memory (106) to the power safe buffer (116) in response to the onset of power outage; optionally copying (167) the content from the power safe buffer (116) to a non-volatile memory (109); storing (169) in the non-volatile memory (109) an indicator indicating whether or not the power safe buffer (116) has valid data; and performing (171) recovery based on the indicator and the data in the power safe buffer (116) when the memory system (108 or 103) is powered up again after the power outage.

For example, the meta data includes the address mapping data of a flash translation layer that maps logical addresses to physical address.

For example, the power safe buffer (116) may lose data after the predetermined period of time. For example, after an amount of power from the capacitor (102) is consumed by the power safe buffer (116) such that the capacitor (102) no longer has sufficient power to maintain the data in the power safe buffer (116). The power manager (114) may set the indicator in the non-volatile memory (109) to indicate that the power safe buffer (116) has valid data during the predetermined period of time and change the indicator to indicate that the power safe buffer (116) does not have valid data upon expiration of the predetermined period of time.

Preferably, copying data from the volatile DRAM (106) to the power safe buffer (116) is faster than storing data in the non-volatile storage media (109). Once the data is copied to the power safe buffer (115), it is no longer necessary to maintain power to the volatile DRAM (106). During the predetermined period of time, the data in the power safe buffer (116) is maintained via the power from the capacitor (102) and can be stored into the non-volatile storage media (109) after the volatile DRAM (106) loses its data.

Preferably, copying data from the power safe buffer (116) to a predefined portion of the non-volatile storage media (109) is performed using a minimum circuit that does not involve the controller (107) running the firmware (104). Thus, once the meta data is dumped into the power safe buffer (116), it is not necessary to further power the controller (117).

For example, a memory system (108 or 103) having a set of non-volatile media (e.g., 109A to 109N or 109), a volatile memory (119 or 106), a buffer memory (116), and a controller (119) configured to process requests from a host system (101) to store data in the non-volatile media (e.g., 109A to 109N or 109) or retrieve data from the non-volatile media (e.g., 109A to 109N or 109). The buffer memory (116) is capable of holding data for at least a predetermined period of time after the volatile memory (119 or 106) loses data during an event of power outage in the memory system (108 or 103). A power manager (114) monitors a power supply (112) of the memory system (108 or 103) to detect an onset of power outage and, in response to the onset of power outage, causes the controller (107) to copy meta data in the volatile memory (119 or 106) to the buffer memory (116).

For example, the set of non-volatile media (e.g., 109A to 109N or 109) includes a flash memory; and the memory system (108 or 103) is a solid-state drive.

For example, the controller (107) has a processor (e.g., 121, . . . , 123) running a flash translation layer with an active, cached, updated copy of an address map that defines the mapping relation between the logical addresses used by the host system (101) to identify memory locations and the respective physical addresses of memory units in the non-volatile storage media (e.g., 109A to 109N, or 109).

For example, the buffer memory (116) has a capacitor (102) that, when fully charged, has sufficient power to allow the buffer memory (116) to hold the data stored in the buffer memory (116) for at least the predetermined period of time after the volatile memory (106) loses data during the event of power outage. The memory system (108 or 103) may be powered up again during this period of time for recovery using the data in the power safe buffer (116).

In some implementations, the power safe buffer (116) is of a same type of memory as the volatile memory (106). Optionally, the volatile DRAM (106) also has a capacitor that allows the volatile DRAM (106) to hold its data for a period of time. However, the capacitor (102) of the power safe buffer (116) can support the power safe buffer (116) to hold data for a period of time longer than the capacitor of the volatile DRAM (106). The power manager (114) consolidates meta data into the power safe buffer (116) such that the meta data can be held in the power safe buffer (116) for a longer period of time and/or for storing into the non-volatile storage media (109).

In some implementations, the power manager (114) includes logic and control, separate from the controller (107), to copy the meta data from the buffer memory (116) to the non-volatile memory (109), before the remaining power in the capacitor (102) becomes insufficient to hold data in the buffer memory (116) (e.g., after the predetermined period of time).

Once the meta data is consolidated in the power safe buffer (116) from the volatile memory (106), the power manager (114) stores an indicator in the non-volatile storage media (109) to indicate that the power safe buffer (116) is holding valid data. Thus, if the memory system (e.g., 108 or 103) is powered up again during the predetermined period of time, the indicator causes the controller (107) to perform recovery and/or diagnosis using the data in the power safe buffer (116).

Upon expiration of the predetermined period of time (or just before the expiration of the predetermined period of time) and/or after the data of the power safe buffer (116) has been copied to a reserved region of the non-volatile storage media (109), the power manager (114) changes the indicator in the non-volatile media (109) to indicate that the buffer memory does not hold valid data. Thus, if the memory system (e.g., 108 or 103) is powered up again during the predetermined period of time, the changed indicator causes the controller (107) to perform recovery and/or diagnosis without using the data in the power safe buffer (116).

The storage system (103) of FIG. 2 can be attached to the host system (101) in FIG. 1 as an implementation of the memory system (108). A communication channel between the host system (101) and the memory system (108) in general and the storage system (103) in particular allows the host system (101) to send data requests and/or other commands that trigger certain operations of the controller (107) on the media (e.g., 109A to 109N, 109), such as data write operations, data read operations, data erasure operations. A host interface (105) implements the communication protocols of the communication channel.

In some implementations, the communication channel between the host system (101) and the memory system (108) or the storage system (103) includes a bus for computer peripheral devices, such as a PCIe bus, a SATA bus, a USB bus.

In some implementations, the communication channel between the host system (101) and the storage system (103) includes a computer network, such as a local area network, a wireless local area network, a wireless personal area network, a cellular communications network, a broadband high-speed always-connected wireless communication connection (e.g., a current or future generation of mobile network link); and the host system (101) and the storage system (103) can be configured to communicate with each other using data storage management and usage commands similar to those in NVMe protocol.

The controller (107) of the storage system (103) can run firmware (104) to perform operations responsive to the communications from the host system (101). Firmware in general is a type of computer program that provides control, monitoring and data manipulation of engineered computing devices.

The storage system (103) can have non-volatile storage media (109). Examples of non-volatile storage media (109) include memory cells formed in an integrated circuit and magnetic material coated on rigid disks. Non-volatile storage media (109) can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors (121, . . . , 123), each having its own in-processor cache memory.

Optionally, the controller (107) performs data intensive, in-memory processing using data and/or instructions organized in the storage system (103). For example, in response to a request from a host system (101), the controller (107) performs a real time analysis of a set of data stored in the storage system (103) and communicates a reduced data set to the host system (101) as a response. For example, in some applications, the storage system (103) is connected to real time sensors to store sensor inputs; and the processors (120, 121, . . . , 123) of the controller (107) are configured to perform machine learning and/or pattern recognition based on the sensor inputs to support an artificial intelligence (AI) system that is implemented at least in part via the storage system (103) and/or the host system (101).

In some implementations, the processors (120, 121, . . . , 123) of the controller (107) are integrated with memory (e.g., 119, 109A, . . . , 109N, 106, 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The storage system (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

Some embodiments involving the operation of the controller (107) can be implemented using computer instructions executed by the controller (107), such as the firmware (104) of the controller (107). In some instances, hardware circuits can be used to implement at least some of the functions. The firmware (104) can be initially stored in the non-volatile storage media (109), or another non-volatile device, and loaded into the volatile DRAM (106) and/or the in-processor cache memory for execution by the controller (107).

A non-transitory computer storage medium can be used to store instructions of the firmware (104) of the memory system (108) in general and the storage system (103) in particular. When the instructions are executed by the controller (107) of the memory system (108) or the storage system (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or micro-controller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory system, comprising:
   a set of non-volatile media;
   a volatile memory configured to store meta data of a flash translation layer for data stored in the set of non-volatile media;
   a buffer memory that is capable of holding the meta data of the flash translation layer for at least a predetermined period of time after the volatile memory loses data during an event of power outage in the memory system, wherein the buffer memory includes a capacitor that when fully charged has sufficient power to allow the buffer memory to hold at least the meta data of the flash translation layer stored in the buffer memory for at least the predetermined period of time after the volatile memory loses data during the event of power outage; and
   a controller configured to process requests from a host system to store data in the set of non-volatile media or retrieve data from the set of non-volatile media;
   wherein a power manager monitors a power supply of the memory system to detect an onset of power outage and, in response to the onset of power outage, causes the controller to copy the meta data in the volatile memory to the buffer memory;
   wherein the power manager stores an indicator in the set of non-volatile media indicating whether the buffer memory holds valid data before expiration of the predetermined period of time;
   wherein after the event of power outage, the controller performs recovery based on the indicator stored in the set of non-volatile media.

2. The memory system of claim 1, wherein the set of non-volatile media includes a flash memory.

3. The memory system of claim 2, wherein the memory system is a solid-state drive.

4. The memory system of claim 3, wherein the meta data includes an address map between logical addresses and physical addresses.

5. The memory system of claim 4, wherein the buffer memory loses the data stored in the buffer memory after the predetermined period of time.

6. The memory system of claim 4, wherein the power manager further causes the controller to store the meta data into the set of non-volatile media during the predetermined period of time.

7. The memory system of claim 6, wherein the power manager changes the indicator in the set of non-volatile media to indicate that the buffer memory does not hold valid data prior to expiration of the predetermined period of time.

8. A method, comprising:
providing a buffer memory that includes a capacitor, in a memory system having:
- a set of non-volatile media;
- a volatile memory configured to store meta data of a flash translation layer for data stored in the set of non-volatile media; and
- a controller configured to process requests from a host system to store data in the set of non-volatile media or retrieve data from the set of non-volatile media, wherein the buffer memory is capable of holding the meta data of the flash translation layer for at least a predetermined period of time after the volatile memory loses data during an event of power outage in the memory system;

monitoring, by a power manager of the memory system, a power supply of the memory system to detect an onset of power outage;

copying, by the controller in response to the onset of power outage, the meta data in the volatile memory to the buffer memory;

charging fully the capacitor of the buffer memory, before the onset of power outage;

powering, using the capacitor, the buffer memory to hold the meta data of the flash translation layer stored in the buffer memory for at least the predetermined period of time after the volatile memory loses data during the event of power outage;

storing an indicator in the set of non-volatile media indicating that the buffer memory holds valid data before expiration of the predetermined period of time; and performing recovery, after the event of power outage, based on the indicator stored in the set of non-volatile media.

9. The method of claim 8, wherein the set of media includes a flash memory; the memory system is a solid-state drive; and the meta data includes an address map between logical addresses and physical addresses.

10. The method of claim 9, wherein the controller includes a plurality of processors running a plurality of processes.

11. The method of claim 10, wherein the buffer memory loses the data stored in the buffer memory after the predetermined period of time.

12. The method of claim 10, further comprising:
storing, during the predetermined period of time, the meta data into the set of non-volatile media.

13. The method of claim 10, further comprising:
changing the indicator in the set of non-volatile media to indicate that the buffer memory does not hold valid data prior to expiration of the predetermined period of time.

14. A non-transitory computer storage medium storing instructions which, when executed by a memory system having a set of non-volatile media, a volatile memory, and a controller, cause the memory system to perform a method, the method comprising:

processing requests from a host system to store data in the set of non-volatile media or retrieve data from the set of non-volatile media, storing in the volatile memory, meta data of a flash translation layer for data stored in the set of non-volatile media;

monitoring a power supply of the memory system to detect an onset of power outage;

copying, by the controller in response to the onset of power outage, the meta data in the volatile memory to a buffer memory that is capable of holding the meta data of the flash translation layer for at least a predetermined period of time after the volatile memory loses data during an event of power outage in the memory system, wherein the buffer memory includes a capacitor that when fully charged has sufficient power to allow the buffer memory to hold the meta data of the flash translation layer stored in the buffer memory for at least the predetermined period of time after the volatile memory loses data during the event of power outage;

storing an indicator in the set of non-volatile media indicating that the buffer memory holds valid data before expiration of the predetermined period of time; and performing recovery, after the event of power outage, based on the indicator stored in the set of non-volatile media.

15. The non-transitory computer storage medium of claim 14, wherein the method further comprises:
changing the indicator in the set of non-volatile media to indicate that the buffer memory does not hold valid data prior to expiration of the predetermined period of time.

* * * * *